(12) United States Patent
Garnham et al.

(10) Patent No.: US 9,919,396 B2
(45) Date of Patent: Mar. 20, 2018

(54) TOOL GRIPPER ARRANGEMENT

(71) Applicant: ANCA Pty Ltd, Victoria (AU)

(72) Inventors: John David Garnham, Victoria (AU); Benn McGrath, Victoria (AU)

(73) Assignee: Anca Pty Ltd, Victoria (AU)

( * ) Notice: Subject to any disclaimer, the term of this patent is extended or adjusted under 35 U.S.C. 154(b) by 0 days.

(21) Appl. No.: 15/032,675

(22) PCT Filed: Oct. 31, 2014

(86) PCT No.: PCT/AU2014/001025
§ 371 (c)(1),
(2) Date: Apr. 28, 2016

(87) PCT Pub. No.: WO2015/061837
PCT Pub. Date: May 7, 2015

(65) Prior Publication Data
US 2016/0263717 A1    Sep. 15, 2016

(30) Foreign Application Priority Data

Oct. 31, 2013   (AU) ................. 2013904217

(51) Int. Cl.
*B23Q 3/155* (2006.01)
*B25J 17/02* (2006.01)
(52) U.S. Cl.
CPC ........ *B23Q 3/1554* (2013.01); *B25J 17/0208* (2013.01); *Y10S 901/31* (2013.01)
(58) Field of Classification Search
CPC .... B23Q 3/1554; Y10S 901/31; B25J 15/026; B25J 15/0253; B25J 17/0208; H01L 21/68707; B25B 5/122; B25B 5/06; B25B 5/068; B25B 5/061; B25B 5/062; B21D 37/02
USPC ........................ 294/207, 119.1, 902; 901/37; 269/32–33, 24, 27, 20, 6, 3
See application file for complete search history.

(56) References Cited

U.S. PATENT DOCUMENTS

| 4,155,169 A | 5/1979 | Drake et al. |
| 4,561,825 A | 12/1985 | Sakata |
| 4,720,023 A | 1/1988 | Quinton |

(Continued)

FOREIGN PATENT DOCUMENTS

| CN | 201132313 Y | 10/2008 |
| CN | 102601657 A | 7/2012 |

(Continued)

OTHER PUBLICATIONS

Abstract for JPH05285766A printed Mar. 31, 2016 from Espacenet Website.

(Continued)

*Primary Examiner* — Stephen A Vu
(74) *Attorney, Agent, or Firm* — Woodard, Emhardt, Moriarty, McNett & Henry LLP

(57) ABSTRACT

A tool gripping arrangement for loading an elongate tool having a lengthwise axis into a collet. The tool gripping arrangement includes a tool clamp comprising a pair of tool clamp grippers for clamping the tool along a clamping axis. The tool gripping arrangement further includes a mounting arrangement for mounting the gripping arrangement to a robot arm, the tool clamp being mounted for free rotation relative to the mounting arrangement.

17 Claims, 2 Drawing Sheets

(56) References Cited

U.S. PATENT DOCUMENTS

| | | | |
|---|---|---|---|
| 4,725,087 A | 2/1988 | Kato | |
| 6,065,791 A * | 5/2000 | Anders | B25J 15/0206 294/116 |
| 7,909,120 B2 * | 3/2011 | Slack | E21B 19/06 166/77.53 |
| 2011/0097185 A1 * | 4/2011 | Braun | H01R 43/20 414/800 |
| 2013/0249229 A1 * | 9/2013 | Roberts | B25J 15/0226 294/198 |

FOREIGN PATENT DOCUMENTS

| | | |
|---|---|---|
| EP | 0198134 B1 | 6/1989 |
| EP | 2 181 814 A1 | 5/2010 |
| JP | H05285766 A | 11/1993 |

OTHER PUBLICATIONS

Written Opinion of the International Searching Authority in related PCT/AU2014/001025 dated Nov. 17, 2014.
Machine Translation of CN102601657A by Lexis Nexis Total Patent on Jun. 22, 2017.
Machine Translation of CN201132313Y by Lexis Nexis Total Patent on Jun. 22, 2017.

* cited by examiner

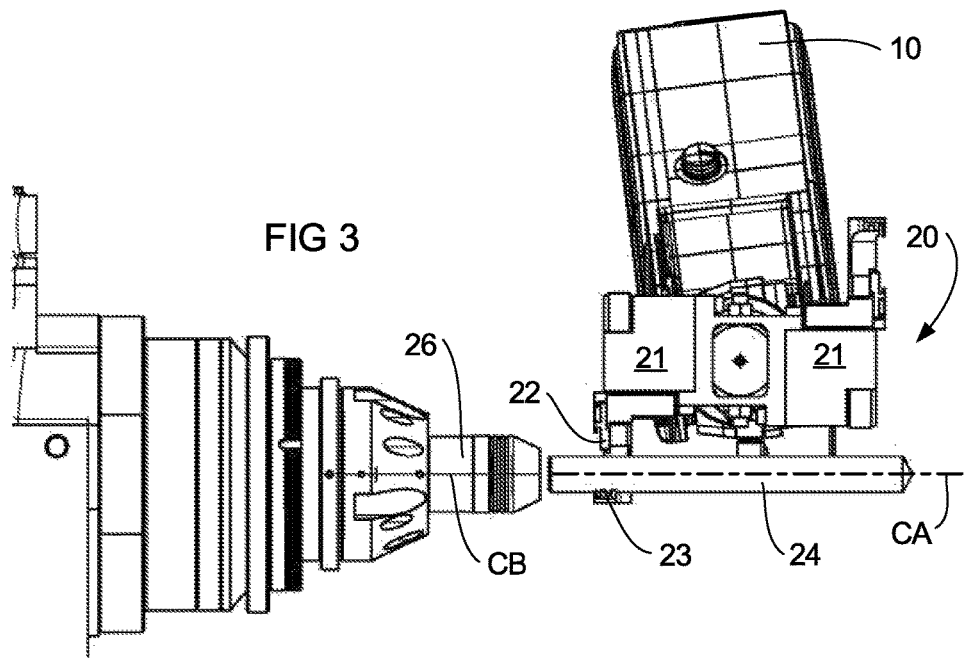
FIG 3
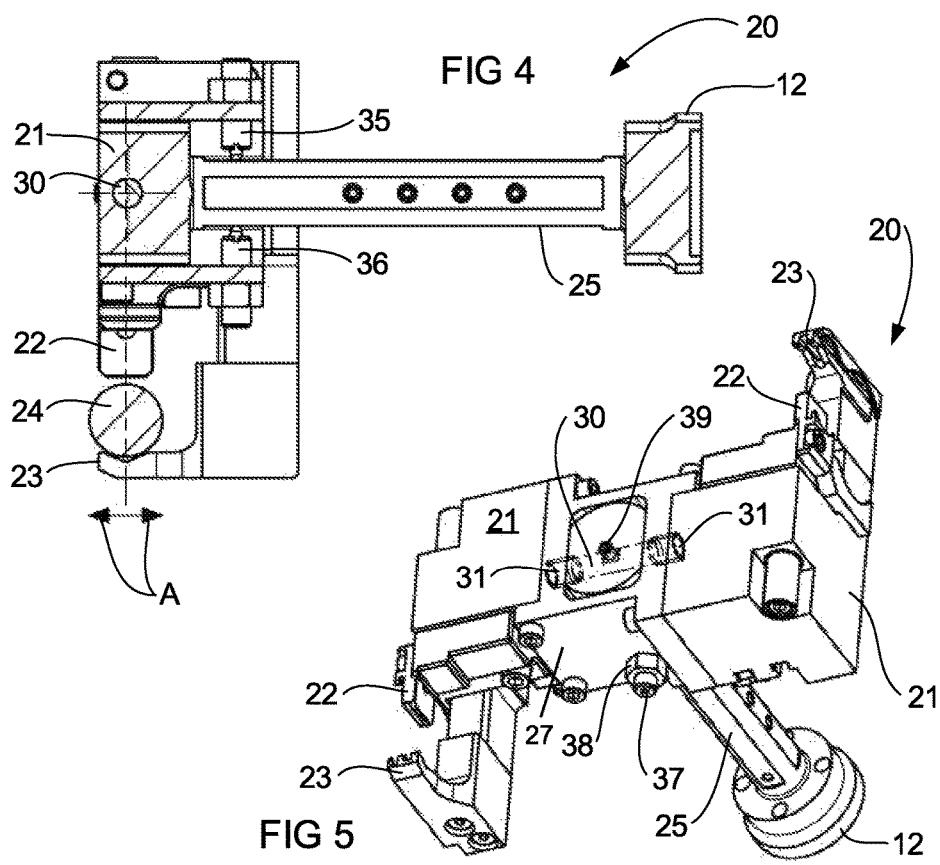
FIG 4
FIG 5

TOOL GRIPPER ARRANGEMENT

TECHNICAL FIELD

The present invention provides a tool gripping arrangement which is hereinafter referred to as a "robot gripper head" and which has principally been developed for loading a tool or tool blank into the collet of a grinding or milling machine. The invention has been developed principally for loading tools into collets where extremely low clearances exist.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

The loading of tools or tool blanks (hereinafter "tools") into the collet of a grinding or milling machine is usually either a manual operation, or a robot controlled operation. More sophisticated grinding or milling machines employ robot loading, which offers advantages in terms of reduced operating personnel and increased safety, by operating personnel being kept away from the grinding or milling interface and the environment within which grinding and milling takes place. The use of robot loading also allows the machinery to be largely enclosed, with the grinding or milling machine and the robotic loader all able to be enclosed within a single cabinet. The need for access to within the cabinet can be infrequent and that provides the advantage that operating personnel can be separated from the grinding or milling interface and protected from the moving parts of the machinery and from the cutting and lubricating oils that are used in the grinding or milling process and fumes that are created.

To load a tool into a collet by robot, the robot arm is calibrated so the arm accurately positions the tool for insertion into the collet. Once calibrated, the robot will continually position the tool to the calibrated position, unless environmental changes affect the dimensions of the robot arm, such as for example that the arm expands or contracts due to changes in temperature or humidity. Environmental changes can also affect the dimensions of the collet or the grinding or milling machinery to which the collet is fixed. For example, many factories within which relevant grinding or milling machines operate, are not temperature controlled, so the temperature can fluctuate during the day. For example, it is common for the environment within which the machines operate to increase in temperature and/or humidity from morning to afternoon and such environmental changes can be sufficient to affect the accuracy with which a robot arm positions a tool for insertion into a collet. Even only small dimensional changes can be sufficient to affect the dimensions of the robot arm in a manner that becomes problematic as explained below. The change in accuracy will not necessarily affect arrangements where the clearance between the tool and the collet is large, but where there is very low clearance, such as between 0 to 20 microns, the change in accuracy can result in either failed loading such as jamming of the tool within the collet, or incorrect loading, the latter of which can result in inaccurately or wrongly machined parts.

For example, where an inaccuracy occurs in loading a tool into a collet so that the longitudinal centre line of a tool becomes misaligned with the centre line of the collet, the tool can engage against one side of the collet and can tend to bend. This is because the robot arm will force the tool into the collet at the position it has been calibrated to load the tool, regardless that the tool is not correctly aligned with the centreline of the collet for loading. The rigidity of the collet and the robot arm provide no potential for movement of the tool into an aligned position, so that the tool will be loaded at a slight angle within the collet, or bent as it is forced into the collet, or both. Because the misalignment can be so small, it will not be easily detectable, and often only becomes apparent once the tool has been machined. If the inaccuracy is not discovered for some time, many tools can be inaccurately machined resulting in significant wasted time and materials.

In more significant conditions of misalignment, the tool can be positioned to load completely offset from the opening of the collet, so that when the tool is advanced by the robot arm to insert the tool into the collet opening, the leading end of the tool engages the face of the collet about the collet opening, but does not enter the opening. If this happens, it is clear to the operator that recalibration is required.

It will be appreciated that once the robot arm is out of alignment, every tool which is loaded will be loaded inaccurately. Only the extent of the misalignment might change. Accordingly, it is the case that calibration of the arm needs to occur from time to time, particularly where significant temperature and/or humidity changes occur throughout the day, and that means down time for the machinery and increased personnel interaction with the machinery. In addition, there is no ability to check when recalibration is required. Thus, recalibration occurs as the machine operator decides or according to a predetermined schedule, or when it is clearly apparent that tools are not being loaded correctly or are being machined inaccurately.

Robot arms that are set up to load tools into collets for grinding or milling, tend to retract and extend in a plane which is approximately perpendicular to the axis of the collet. Such robot arms are usually also set up to extend and retract generally horizontally rather than at an angle or vertically. Such arms which operate horizontally tend to have a small movement or "compliance" in the vertical direction, but are very stiff in the horizontal direction and therefore lack movement or compliance in that direction. Thus, inaccuracy in the placement of the tool for loading into the collet tends to be accommodated in the vertical direction by the allowable movement or compliance in the robot arm, but there is no such accommodation in the horizontal direction. In such arms as discussed above, it follows that it is lack of compliance in the horizontal direction that results in misloading of a tool in the collet and subsequent inaccurate machining, or a complete failure to load because the tool is positioned to load offset from the opening of the collet.

In contrast, if a robot arm was set up to extend and retract generally vertically, then the available compliance would be in the horizontal direction and not in the vertical direction. In effect, the available compliance is generally in the direction perpendicular to the direction in which the robot arm extends and retracts and the need for compliance is in the direction in which the robot arm extends and retracts.

Applicant has therefore recognised that the development of a tool gripper which can be mounted to a robot arm and which provides for compliance in the direction in which the robot arm extends and retracts, would be desirable.

SUMMARY OF INVENTION

The present invention provides a tool gripping arrangement for loading an elongate tool having a lengthwise axis into a collet, the tool gripping arrangement including a tool clamp gripper for clamping a tool along a clamping axis, and a mounting arrangement for mounting the gripping arrangement to a robot arm, the tool clamp gripper being mounted for free rotation relative to the mounting arrangement.

A tool gripping arrangement of the above kind advantageously can provide for compliance in the horizontal direction by rotational movement of the tool clamp gripper through an arc that shifts a tool which is clamped by the tool clamp gripper along the clamping axis, at least partially horizontally. The clamping axis is the axis along which a tool is clamped for insertion into a collet. Such a tool gripping arrangement can be arranged to provide compliance in other directions, the vertical direction for example, utilising rotation of the tool clamp gripper in the same manner, but given that the majority of robot arms to which the present invention relates will extend and retract in the horizontal direction, further discussion of the invention will be made in relation to compliance in the horizontal direction.

Rotational movement of the tool clamp gripper through an arc will generate both horizontal and vertical movement. However, vertical movement can be almost negligible and is in any event not problematic given the inherent compliance in the robot arm in the vertical direction. That means that any vertical movement of the clamped tool that is generated through arcuate movement of the tool clamp gripper during rotation can be accommodated or corrected through compliant movement in the robot arm. The horizontal movement is not corrected by compliant movement in the robot arm given the stiffness of the robot arm in that direction. Thus, the tool which is clamped by the tool clamp gripper can be shifted horizontally to accommodate misalignment of the tool relative to the opening in a collet and the tool can thereafter be inserted into the collet without jamming or misloading.

It is to be noted that the arcuate movement of the tool clamp gripper is intended to be very small and to correct misalignment in the relative positions of the tool and the collet opening in the order of up to about 300 microns. This is about the maximum misalignment that would occur in environments in which there is significant thermal expansion in the robot arm in a manufacturing facility over a period of time, such as from morning through to afternoon. However, it is expected in most circumstances that the invention will be required to correct orders of misalignment of much smaller amounts.

Rotation of the tool clamp gripper is free or unrestricted rotation so that the clamp gripper can rotate to the extent necessary for each loading of a tool into a collet. The tool clamp gripper is preferably easily rotated so that there is little or no resistance to rotation and so that rotation can occur quickly and to the extent required for the misalignment to be corrected. Free rotation simply means that the tool clamp gripper is rotatable without being driven or otherwise controlled.

As thermal expansion or contraction in the robot arm occurs, the amount of rotation required will change and free rotation allows the tool clamp gripper to rotate the required amount. The allowable arcuate angle of rotation can be restricted and in some forms of the invention, mechanical stops are formed at each end of the arc to restrict the maximum allowable rotation. In some forms of the invention, the maximum allowable arc of rotation is in the order of about 100 micron, although more or less rotation can be allowed for, such as 300 microns or 0.5 mm or more. The use of a stop or stops to restrict the maximum allowable rotation beneficially means the tool gripping arrangement of the invention will only provide compliance to a predetermined level, and will not continue to correct misalignment in circumstances where the misalignment is excessive to the point at which re-calibration should be undertaken.

The axis about which the tool clamp gripper is rotated relative to the clamping axis, is preferably positioned above the clamping axis in the operational position of the tool gripping arrangement. Further, the tool clamp gripper is preferably mounted for free rotation relative to the mounting arrangement about an axis which is offset from but substantially parallel to the clamping axis of an elongate tool which is clamped in the tool clamp gripper. That is, with the tool gripping arrangement installed on a robot arm, as required, the respective axes of the tool clamp gripper and the clamping axis are substantially parallel, but are not aligned vertically.

The advantage of the above arrangement is that as the clamping axis moves away from its original calibrated position by thermal expansion or contraction of the robot arm, the axis nevertheless remains parallel to the axis of the collet into which a tool which is clamped in the clamping axis is to be inserted.

The extent to which the respective axes of the tool clamp gripper and the clamping axis remain substantially parallel depends on the application to which the invention is put. Given the extreme accuracy in which some forms of the invention are intended to operate, the respective axes are always likely to be within microns of being absolutely parallel, but greater divergence is acceptable particularly as the tolerance between the respective axes of the collet opening and the tool increases. In one form of the invention, the amount of misalignment has been measured as to be 20 micron measured over a length of 50 mm. This equates to a 0.023° misalignment.

In defining that the rotational axis of the tool clamp gripper is preferably above the clamping axis, it is to be noted that while vertical alignment of the respective axes is possible, it is not required. Rather, the rotational axis of the tool clamp gripper can be offset horizontally from the clamping axis, as well as being above the clamping axis, with the preference being that the respective axes remain substantially parallel.

The offset relationship described above between the axis of the tool clamp gripper and the clamping axis can be such as to space the axes apart any appropriate distance and in any direction subject to the preference that the axes remaining substantially parallel. By that arrangement, relative rotation between the respective axes will create the arcuate movement to provide any horizontal compliance required to load a tool into a collet. In most cases, it is expected that the dimensions of the equipment with which the tool gripping arrangement of the invention is employed will dictate the size of the tool gripping arrangement and thus the allowable offset distance between the respective axes of the tool and the tool clamp gripper. However, as the radius of the rotational arc through which the clamping axis rotates increases, the flatter the movement of a tool in the compliance direction will be. A first prototype of a tool gripping arrangement according to the invention has a radius of about 80 mm and an arc of about 100 micron and in that prototype, the vertical component of the movement was negligible and was easily accommodated through vertical compliance of the robot arm.

It should be noted that despite it being preferable that the rotational axis of the tool clamp is above the clamping axis, it is within the scope of the present invention that the rotational axis of the tool clamp is below the clamping axis. Moreover, the physical position at which the tool clamp rotates can be forward or rearward of the physical position at which the tool clamp clamps a tool, or non-planar with the tool clamp. Thus, the physical positions of the respective axes are not critical. As indicated above, in one form of the invention, the tool clamp gripper is mounted for rotation through an arc of about 100 microns. However, the arc could be smaller or greater than this. To facilitate arcuate movement, the tool clamp gripper can be fixed to a shaft that rotates or it can be mounted to rotate relative to a shaft, such as a shaft that is fixed or stationary. In one form, the tool clamp gripper includes an opening into which a shaft extends and the tool clamp is rotatable about the shaft. A bush can be inserted into the opening and the shaft can extend into the bush. The fit between the shaft and the opening or the bush must be a close fit but still allow free rotation of the tool clamp gripper relative to the shaft. The fit should also minimise running clearance in order to minimise angular error between the tool clamp gripper and the collet opening. In one form of the invention, the fit can be a G6/g6 fit as defined in the relevant ISO 286-1:2010 classification. Lubrication can be employed to ensure unrestricted rotation of the tool clamp gripper on the shaft.

The opening of the tool clamp gripper can be formed in any suitable part of the tool clamp gripper and is spaced from gripper fingers that will grip a tool and which form the clamping axis. As indicated above, the spacing in one form of the invention is about 80 mm. This spacing defines the radius about which the tool clamp gripper rotates.

The gripper fingers can be pneumatically, hydraulically or electrically operable. The gripper fingers can comprise in some forms of the invention a shaped bearing surface, V-shaped for example, and a movable clamping member. The clamping member can be moved relative to the bearing surface to clamp or release a tool. The movement is typically linear movement forward and away from the bearing surface and the clamping member would normally also include a shaped bearing surface, with the respective bearing surfaces being configured to securely clamp the type of tool being machined.

Tool clamp grippers are known and various types and styles exist. The present invention is intended for use with different types and styles of tool clamp grippers as may benefit from the compliance provided by the present invention. The present invention extends also to gripping arrangements that include multiple tool clamp grippers in addition to gripping arrangements that include a single tool clamp gripper. Thus, the gripping arrangement can include a pair of tool clamp grippers that can be arranged, for example, symmetrically about a single principal axis about which each of the tool clamp grippers is rotatable. The principal axis is the axis which is preferably substantially parallel to the clamping axis of the tool clamp grippers and in this arrangement, each time an elongate tool is clamped in one of the pair of tool clamp grippers the axis of the tool is substantially parallel to the principal axis.

The benefit of a tool gripping arrangement that includes a pair of tool clamp grippers is that as one tool is being loaded into a collet by a first tool clamp gripper, another tool can be clamped by the second tool clamp gripper ready for loading. As the tool of the first tool clamp gripper is loaded into a collet, the second tool clamp gripper can clamp a new tool ready for loading into the collet upon completion of the machining of the tool of the first tool clamp gripper. Once the tool of the first tool clamp gripper has been machined, the first tool clamp gripper can clamp the tool again and remove it from the collet and then the gripping arrangement can be rotated to bring the tool already clamped in the second tool clamp gripper to a position to load into the collet and the first tool clamp gripper can release the machined tool. The first tool clamp gripper can then clamp a further tool for machining once the tool of the second tool clamp gripper has been machined and removed from the collet. This process can be repeated for as many tools there are to be machined.

It should be appreciated that while tool gripping arrangements that have one or two tool clamp grippers are expected to be the most popular form of tool gripping arrangement, the invention extends to tool gripping arrangements that include 3 or more tool clamp grippers.

The tool gripping arrangement of the invention can be connected to a robot arm in any suitable manner. Thus, any suitable interface can be adopted. Robot arms have what is known in the industry as an "end effector" which is the part of the robot arm to which tool gripping arrangements for tool machining are normally connected. The present invention is intended to be connected to an end effector and for that, the gripping arrangement can include a base for connection to the end effector and an arm or shaft, or mounting block or other member or component that extends from the base to the tool clamp. The tool clamp gripper can be fixed to the arm or shaft or mounting block or other member or component (hereinafter referred to as an "arm" but incorporating any of the shaft or mounting block or other member or component) for rotation. For example, the end of the arm can include a shaft which is rotatable and the tool clamp gripper can be fixed to the shaft to rotate with the shaft, or the shaft can be fixed to the arm and the tool clamp gripper can rotate relative to or about the shaft.

It was earlier described that two tool clamp grippers could be employed and in relation to the above arrangement, the shaft can support two tool clamp grippers, one on each end. The connection between the tool clamp grippers and the shaft can be identical.

The tool gripping arrangement of the invention can include a return mechanism to return the tool clamp gripper to a home or operating position at which the tool clamp gripper is at a predetermined, non-rotated position. That mechanism can have any suitable form as long as the free or unrestricted rotation of the tool clamp gripper is not affected. In one form the return mechanism includes a biasing arrangement that acts on the arm that extends between the end effector of the robot arm and the tool clamp gripper. In this arrangement, the tool clamp gripper is rotatable relative to the arm from a home position and the return mechanism is operable to return the tool clamp gripper by interaction with the arm to that position after the tool clamp gripper has been rotated through an arc suitable to provide compliance for the insertion of a tool into a collet.

One suitable biasing arrangement includes a pair of spring biased plungers that are in engagement, preferably touching engagement with opposite sides of the arm and whereby rotation of the tool clamp gripper depresses one plunger against a bias so that once the tool has been loaded into the collet and has therefore been released from the tool clamp gripper, the tool clamp gripper is free to rotate, the spring plunger that has been depressed can extend, pushing against the surface of the arm and rotate the tool clamp back to the home position.

The use of a pair of spring biased plungers permits return movement regardless of the direction in which the tool clamp is rotated to load a tool into a collet because clockwise rotation of the tool clamp to load a tool can be returned by one of the spring biased plungers and anti-clockwise movement can be returned by the other of the plungers. Also, the pair of plungers operates together whereby when each plunger is fully extended in the home position of the tool clamp, they apply a light bearing load on the arm which tends to maintain the tool clamp gripper in the home position, so that the tool clamp gripper is correctly positioned to clamp a new tool.

The spring biased plungers are described above as being set up to apply only a light bearing load on the arm when the tool clamp gripper is in the home position. This is preferred as it minimises the influence that the plungers have resisting rotation of the tool clamp gripper. Thus, the tool clamp gripper is able to easily rotate despite the resistance of the spring biased plungers and to allow the clamped tool to be aligned properly for insertion into the collet. Nevertheless, the biasing influence the plungers exert on the arm can be of any suitable force and in some arrangements of the invention, a load which is greater than a light bearing load can be applied. In one form of the invention, the plungers are depressed and the tool clamp gripper can rotate upon the tool and collet generating a 1 kg load during loading of the tool into the collet opening in a misaligned position. In this form of the invention, the springs of the spring plungers are preloaded to about 35.3 N and the spring rate is about 2 N/mm. The preloading is provided so that the spring biased plungers will hold the weight of the tool clamp gripper at the home position until the preload is exceeded by the load generated between the tool and the collet. These figures depend on various factors including the weight of the tool clamp gripper and the moment generated during rotation of the tool clamp gripper from the point of rotation to the centre of mass of the gripper.

It is to be appreciated that the arm which is referred to above for connection between the end effector and the gripping arrangement can be of a different form. The tool clamp could for example be connected directly to the end effector or it could be connected to the end effector by an alternative arrangement, such as a spacer, fixer or bracket.

BRIEF DESCRIPTION OF DRAWINGS

In order that the invention may be more fully understood, some embodiments will now be described with reference to the figures in which:

FIG. 3 is a top view of the tool gripping arrangement of FIG. 1.

FIG. 4 is a partially cross-sectional view of a tool gripping arrangement of the earlier figures.

FIG. 5 is an isometric view of the tool gripping arrangement of the earlier figures.

DETAILED DESCRIPTION

Figure 1:
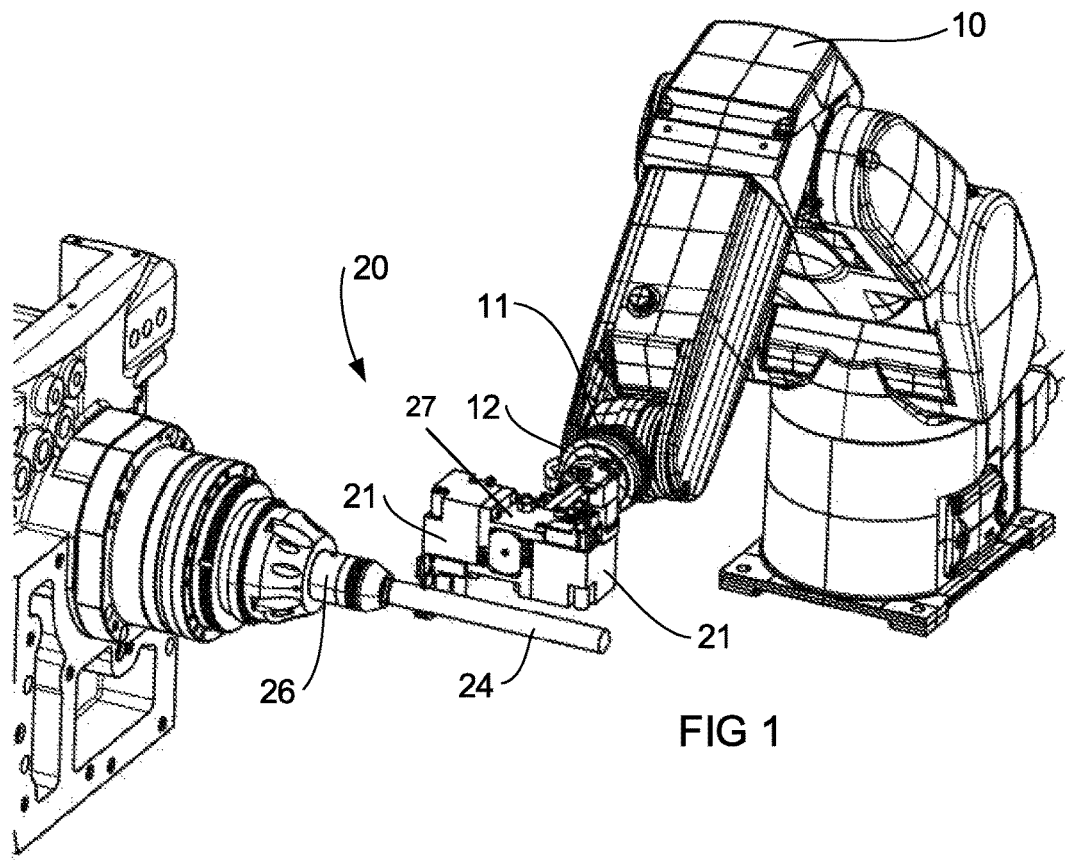
FIG. 1 is a isometric view of a tool gripping arrangement attached to a robot arm and located in front of a collet.
Figure 2:
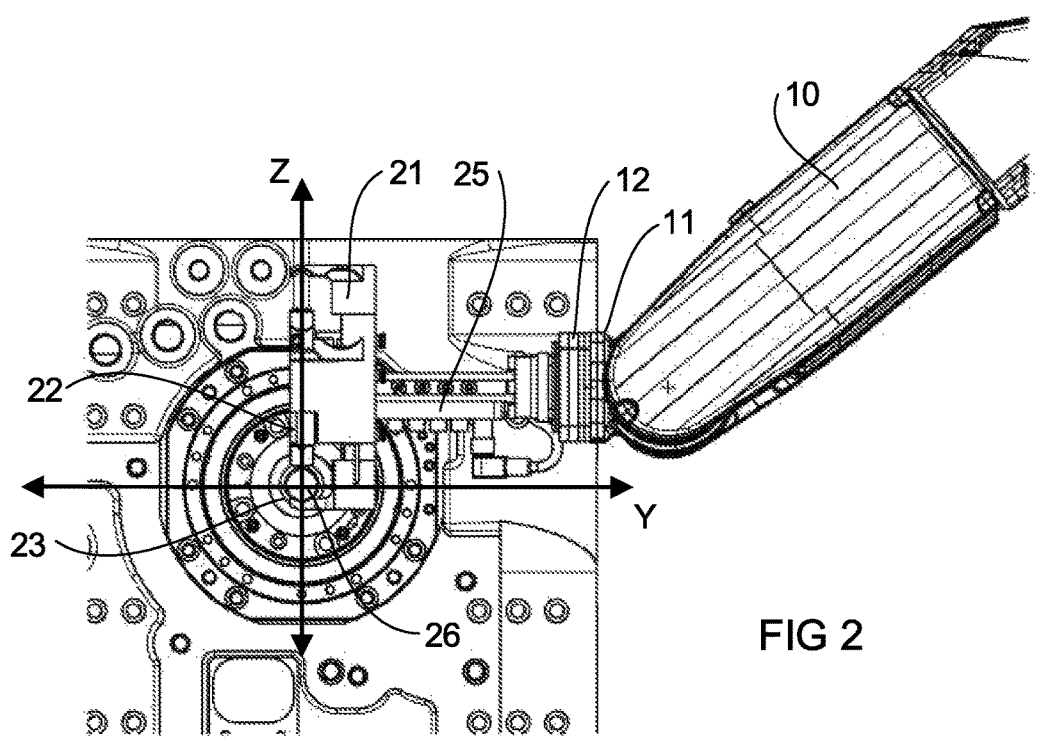
FIG. 2 is an end view of the tool gripping arrangement of FIG. 1.

FIGS. 1 to 3 illustrate the invention in a position for loading a tool into a collet of a grinding or milling machine. FIG. 1 thus shows a robot arm 10 which has an end effector 11 and in turn, to which is attached the base 12 of a tool gripping arrangement or robot gripper head 20. The tool gripping arrangement 20 includes a pair of tool clamp grippers 21 that each includes a pair of gripper fingers 22 and 23 (see FIG. 4) for gripping a tool 24 and the tool gripping arrangement 20 is attached to the end effector 11 via a shaft or arm 25.

The tool clamp grippers 21 are of a standard form and their operation would be known to persons skilled in the art. Accordingly, the manner in which the tool clamp grippers 21 operate to clamp a tool is not further discussed herein. The tool grippers are mounted to a body 27 for rotation relative to the body 27. The arm 25 extends into the body 27 and is fixed to the body.

One of the tool clamp grippers 21 is shown gripping the tool 24 and being positioned in front of a collet 26 into which the tool 24 is to be loaded. The collet 26 includes a central opening for receipt of a tool and a clamping arrangement which clamps about the tool so that the tool can be held by the collet for machining. Again, the manner in which the collet 26 receives and clamps a tool is known to persons skilled in the art and so again, is not to be discussed in detail herein.

In extremely high accuracy milling or grinding machinery, the position of the tool must be extremely accurate for loading into the collet, as the clearance between the outside surface of the tool and the bore of the collet when the tool is inserted into the bore but before the collet clamps the tool, is often extremely small and in the order of 0 to 20 microns. Accordingly, misalignment of the axes of the tool and the bore can cause the tool to be incorrectly mounted within the bore, ie at an angle, or it can cause the tool to be bent as it is forced into the bore.

As explained earlier, environmental factors can influence the positioning of a tool by the tool gripper 21 so that the lengthwise axis of the tool is not exactly aligned with the axis of the collet bore. Where this occurs, insertion of the tool 24 into the collet bore occurs along axes of the tool and the collet which are offset and which can bend the tool as it is forced into the collet bore. If there is sufficient misalignment of the axes, the tool can jam. Despite this, if the tool can be loaded, it can sometimes be loaded at an angle and that can result in inaccurate machining.

The difficulty with loading a tool into a collet is described above, but it also needs to be understood that similar difficulties can be experienced when a tool is unloaded from the collet. In those circumstances, misalignment of the tool clamp grippers 21 with the tool 24 which is held by the collet 26 can result in the tool being clamped at an angle in the tool clamp gripper 21, which hinders removal of the tool 24 from the collet 26 and can bend the tool 24 or cause the tool 24 to jam. This can damage an otherwise properly machined and accurately formed tool. Thus proper alignment of the tool axis and the bore axis is required for loading and unloading a tool from a collet.

In FIGS. 1 to 3, the tool 24 is shown clamped between clamping fingers 22 and 23. The tool 24 is clamped in this position along the clamping axis CA (see FIG. 3) of the tool clamp gripper 21. The axis of the tool 24 is thus the clamping axis CA when a tool is clamped in the tool clamp gripper 21. In the position shown, the tool 24 is perfectly aligned with the axis CB of the bore of the collet 26, which cannot be seen in FIG. 1 or 2. However, if there was misalignment between the axis CA of the tool and the axis CB of the collet bore, flexibility or compliance in the robot arm 10 will allow for movement of the tool 24 in the indicated vertical or Z axis (see FIG. 2), but because of the stiffness of the robot arm in the horizontal or Y axis, there is need for compliance for correction of misalignment (or insufficient correction of misalignment) in that direction. The present invention has therefore been developed in order to allow for compliance in the Y axis so that where slight misalignment between the longitudinal axis CA of a tool and the axis CB of the bore of the collet 26 is present, slight movement of the tool 24 is allowed to align, or improve the alignment, so that the tool 24 can be loaded correctly into the collet bore and unloaded correctly after the tool 24 is machined.

FIG. 4 is a side cross-sectional view of the tool gripping arrangement 20 of FIGS. 1 to 3 without showing the robot arm 10 and the collet 26. FIG. 4 also shows a tool 24 clamped between the clamping fingers 22 and 23 of the tool clamp gripper 21. FIG. 4 also shows a component of the gripping arrangement 20 which will be discussed in more detail in relation to FIG. 5 and which comprises a shaft 30. The shaft 30 is located directly above the tool 24 and along the same centreline and it is about the shaft 30 that the tool clamp grippers 21 rotate for compliance movement in the Y axis. Thus, the respective axes of the shaft 30 and the tool 24 are substantially parallel. FIG. 4 further shows arrows A that show the direction of compliance available to the tool 24 if required.

Referring now to just one of the tool clamp grippers 21, being the tool clamp gripper 21 visible in FIG. 4, this is mounted for rotation about the shaft 30 for compliance movement in the Y axis. The tool clamp gripper 21 can therefore freely rotate through a shallow ark about the shaft 30, in the direction shown by arrows A. While the arrows A show linear movement, the actual movement of the tool is arcuate given that the movement is about an axis. That rotational movement provides compliance in the Y axis as outlined in FIG. 2. Thus, the tool 24 would be moved by the robot arm 10 for insertion into the bore of the collet 26. However, with misalignment between the axes CA and CB, the leading end of the tool 24 would be position slightly offset from a position of proper alignment with the bore. The leading end of the tool 24 might therefore engage against a surface of the leading end of the collet. With a rigid arrangement in which there was not compliance in the Y axis, this could mean that the tool would be incorrectly mounted within the bore, ie at an angle, or it could bend the tool by forcing the tool into the bore.

However, by mounting the tool clamp grippers 21 for free rotation relative to the shaft 30, the tool clamp grippers 21 can shift in the Y axis so that the axis CA moves to alignment with the axis CB, or at least to closer alignment, so that the tool 24 can be inserted into the collet bore without damage and without misalignment. The free rotation is quick and the extent is that which is required to properly align the tool for insertion and is automatic in the sense that it does not require operator input. The amount of movement is effectively customised to the amount of misalignment that is present. The mechanism is also simple, yet it addresses the problems of misalignment outlined herein successfully and without requiring a complex mechanism or a complex control arrangement.

With reference to FIG. 5, the tool gripping arrangement 20 of FIGS. 1 to 4 is shown in isolation and in FIG. 5, without a tool being gripped. As is evident from FIG. 5, the tool gripping arrangement 20 includes a pair of tool clamp grippers 21 which are mounted on either side of the arm 25.

The shaft 30 of FIG. 4 is shown in FIG. 5 in broken line as indicating that the shaft is normally obscured from view and is shown extending from one tool clamp gripper 21 to the other. In fact, the shaft 30 extends into the tool clamp grippers 21 and the tool clamp grippers 21 each include a bush 31 which locates about each end of the shaft 30. The shaft 30 extends through a leading end of the arm 25 and is stationary relative to the arm 25. Each of the tool clamp grippers 21 and their respective bushes 31 rotates relative to the shaft 30 when required for compliance in the Y axis.

It will be appreciated that the amount of rotation required for compliance in the Y axis is very small, and in the order of microns. The maximum out of alignment can be in the order of about 300 microns. A feature of the present invention is an ability to limit the maximum amount of rotation of either of the tool clamp grippers 21. With reference to FIG. 4, a pair of spring biased plungers 35 and 36 act on the outside surface of the arm 25 and apply a light biasing load between the arm 25 and the tool clamp grippers 21. In FIGS. 4 and 5, one end 37 of the spring plunger 36 is visible and is fixed in place by a nut 38.

FIG. 4 shows the spring plungers in position where the tool clamp grippers 21 are in a home position in which they have no rotation relative to the shaft 30. As will be appreciated, if the tool clamp gripper 21 of FIG. 4 was required to rotate in a clockwise direction to provide compliance in the Y axis, the lower plunger 36 would be depressed against the spring bias (a spring) within the plunger. That rotation of the tool clamp gripper 21 would enable proper loading of a tool into the bore of the collet 26 and as soon as that loading is complete, the tool gripper 21 will release the tool and retract away from the collet to allow relevant grinding or milling of the tool to take place. Moreover, upon release of the tool, the tool clamp gripper 21 will be free to rotate in an anti-clockwise direction back to the home position under the influence of the bias load applied by the plunger 36. Once the tool clamp gripper 21 has returned to the home position, both of the plungers 35 and 36 exert only a light load against the surface of the arm 25. Establishing the home position is beneficial for the tool clamp grippers 21 to be positioned properly for clamping a new tool after a tool has been loaded into the bore of the collet 26.

The same process as described above applies to compliance in the Y axis in which the tool clamp grippers 21 are required to rotate in the anti-clockwise direction for loading and unloading a tool and therefore that movement causes depression of the plunger of the spring biased plunger 35 against the spring bias of the plunger 35. In that situation, it is the plunger 35 that returns the tool clamp gripper 21 to the home position, but in the home position, the respective plungers 35 and 36 operate together to apply a light load to maintain the tool clamp in the home position.

The arrangement illustrated in the FIG. 5 shows an arrangement in which a pair of tool grippers 21 is provided. It should be appreciated that the invention also extends to an arrangement in which only a single tool gripper is provided, or where more than two grippers are provided.

A further feature of the spring plunger arrangement is that it also limits the amount of rotation that a tool clamp gripper can provide. Each spring plunger 35 and 36 has a maximum amount of plunger depression and once that maximum has been reached, it will not allow any further rotation of the tool clamp gripper 21. It would be appreciated however, that other forms of arrangements could be employed to achieve the same limitation in tool clamp gripper rotation.

The tool clamp grippers 21 are fixed to the arm 25 in a very simple manner by a retaining screw 39. The screw 39 extends through the shaft 30 and into the facing end of the arm 25 and thus locks the shaft 30 against rotation and secures the tool clamp grippers in place relative to the arm 25.

It is to be noted that other than providing compliance movement as described above, the tool clamp grippers 21 act in the normal manner that they would normally act otherwise. Thus, the provision for compliance does not affect the manner in which the tool clamp grippers 21 clamp or the clamping force they impart.

It should also be appreciated that the tool gripping arrangement 20 that has been illustrated as comprising the tool clamp grippers 21 each having clamping fingers 22 and 23 is just one form of tool gripping arrangement that can be employed with the present invention. Ultimately, the form of tool clamp or tool gripper is unimportant, provided that the gripper can be mounted for rotation to allow compliance in the Y axis.

What is also important in the illustrated device, is that the axis about which the tool gripper 21 rotates (the axis of the shaft 30) is offset from, but substantially parallel, to the axis of a tool which is clamped by the gripper fingers 22 and 23 (the axis CA). As will be evident from the preceding discussion, the axis of the tool that is clamped in that manner is the clamping axis of the gripping arrangement of the invention. The respective axes are generally parallel and offset.

It will also be evident from the figures, that the axis of rotation about the shaft 30 and the clamping axis discussed above, are generally or substantially perpendicular to the direction of compliance in the Y direction. This follows as a result of the arrangement of the axis rotation and the clamping axis discussed above.

The invention described herein is susceptible to variations, modifications and/or additions other than those specifically described and it is to be understood that the invention includes all such variations, modifications and/or additions which fall within the spirit and scope of the present disclosure.

The claims defining the invention are as follows:

1. A tool gripping arrangement for loading an elongate tool having a lengthwise axis into a collet, the tool gripping arrangement including a pair of tool clamps each capable of separately clamping a tool along a clamping axis, and a mounting arrangement for mounting the gripping arrangement to a robot arm the mounting arrangement including a base for connection to an end effector of the robot arm and an arm that extends from the base to the tool clamp, the tool clamp being mounted for free rotation relative to the mounting arrangement.

2. A tool gripping arrangement according to claim 1, wherein rotation of the tool clamp is restricted to within an arc of between 20 and 300 micron.

3. A tool gripping arrangement according to claim 2, wherein rotation of the tool clamp is restricted by mechanical stops formed at each end of the arc of rotation.

4. A tool gripping arrangement according to claim 1, the axis of rotation of a tool clamp of the tool clamps when clamping a tool along a clamping axis being located above the clamping axis.

5. A tool gripping arrangement according to claim 4, the axis of rotation of the tool clamp being vertically above the clamping axis.

6. A tool gripping arrangement according to claim 4, the axis of rotation of the tool clamp being offset horizontally from the clamping axis.

7. A tool gripping arrangement according to claim 1, the tool clamps being mounted for free rotation relative to the mounting arrangement about an axis which is offset from but substantially parallel to the clamping axis of an elongate tool which is clamped in a tool clamp of the tool clamps.

8. A tool gripping arrangement according to claim 1, the axis of rotation of a tool clamp of the tool clamps being forward or rearward of the position at which the tool clamp clamps a tool.

9. A tool gripping arrangement according to claim 1, the tool clamp being fixed to a shaft that rotates and being rotatable with the shaft.

10. A tool gripping arrangement according to claim 1, the tool clamp being rotatably mounted to a shaft.

11. A tool gripping arrangement according to claim 1, the pair of tool clamps being arranged symmetrically about a single principal axis about which each of the tool clamps is rotatable, whereby the principal axis is substantially parallel to the clamping axis.

12. A tool gripping arrangement for loading an elongate tool having a lengthwise axis into a collet, the tool gripping arrangement including a tool clamp for clamping a tool along a clamping axis, and a mounting arrangement for mounting the gripping arrangement to a robot arm, the mounting arrangement including a base for connection to an end effector of the robot arm and an arm that extends from the base to the tool clamp, the tool clamp being fixed to the arm that extends from the base to the tool clamp for free rotation relative to the mounting arrangement.

13. A tool gripping arrangement according to claim 12, the end of the arm that extends from the base to the tool clamp including a shaft which is rotatable and the tool clamp being fixed to the shaft to rotate with the shaft.

14. A tool gripping arrangement according to claim 12, the end of the arm that extends from the base to the tool clamp including a shaft which is fixed to the arm and the tool clamp being rotatable about the shaft.

15. A tool gripping arrangement for loading an elongate tool having a lengthwise axis into a collet, the tool gripping arrangement including a tool clamp for clamping a tool along a clamping axis, and a mounting arrangement for mounting the gripping arrangement to a robot arm, the mounting arrangement including a base for connection to an end effector of the robot arm and an arm that extends from the base to the tool clamp, the tool clamp being mounted for free rotation relative to the mounting arrangement, the tool gripping arrangement further including a return mechanism to return the tool clamp from a rotated position to a home position.

16. A tool gripping arrangement according to claim 15, including a return mechanism to return the tool clamp from a rotated position to a home position, the return mechanism including a biasing arrangement that acts on the arm that extends from the base to the tool clamp.

17. A tool gripping arrangement according to claim 16, the biasing arrangement includes a pair of spring biased plungers that are in engagement with opposite sides of the arm that extends from the base to the tool clamp and whereby rotation of the tool clamp depresses one plunger against a bias so that once the tool is free to rotate, the depressed spring plunger can extend, pushing against the surface of the arm and rotating the tool clamp back to the home position.

\* \* \* \* \*